US012060844B1

(12) United States Patent
Baramov et al.

(10) Patent No.: US 12,060,844 B1
(45) Date of Patent: Aug. 13, 2024

(54) AIR-PATH COORDINATION IN AN ENGINE

(71) Applicant: Garrett Transportation I Inc., Torrance, CA (US)

(72) Inventors: Lubomir Baramov, Prague (CZ); Ondrej Santin, Prague (CZ)

(73) Assignee: Garrett Transportation Inc., Torrance, CA (US)

( * ) Notice: Subject to any disclaimer, the term of this patent is extended or adjusted under 35 U.S.C. 154(b) by 0 days.

(21) Appl. No.: 18/396,674

(22) Filed: Dec. 26, 2023

Related U.S. Application Data

(60) Provisional application No. 63/517,606, filed on Aug. 3, 2023.

(51) Int. Cl.

| | |
|---|---|
| ***F02D 41/00*** | (2006.01) |
| ***F02B 29/04*** | (2006.01) |
| ***F02B 37/18*** | (2006.01) |
| ***F02B 37/22*** | (2006.01) |

(52) U.S. Cl.

CPC .......... *F02D 41/0007* (2013.01); *F02B 29/04* (2013.01); *F02B 37/183* (2013.01); *F02B 37/22* (2013.01); *F02D 41/005* (2013.01); *F02D 2200/0406* (2013.01); *F02D 2200/0414* (2013.01)

(58) Field of Classification Search

CPC ............... F02D 41/0007; F02D 41/005; F02D 41/0072; F02D 2041/1433; F02D 2200/0406; F02D 2200/0414; F02B 29/04; F02B 37/18; F02B 37/183; F02B 37/22; F02B 37/24; F02M 26/06

See application file for complete search history.

(56) References Cited

U.S. PATENT DOCUMENTS

| | | | |
|---|---|---|---|
| 4,046,003 | A | 9/1977 | Armstrong et al. |
| 5,968,107 | A | 10/1999 | Vogan et al. |
| 6,298,718 | B1 | 10/2001 | Wang |
| 6,637,205 | B1 | 10/2003 | Ahmad et al. |
| 7,143,580 | B2 | 12/2006 | Ge |
| 7,296,562 | B2 | 11/2007 | Withrow et al. |
| 7,631,498 | B2 | 12/2009 | Greentree |
| 8,146,358 | B2 | 4/2012 | Greentree |
| 8,850,878 | B2 | 10/2014 | Flynn et al. |
| 9,014,918 | B2 | 4/2015 | Hagen et al. |
| 9,789,756 | B2 | 10/2017 | Schwartz et al. |
| 10,235,479 | B2 | 3/2019 | Pachner |
| 10,272,779 | B2 | 4/2019 | Tschanz |

(Continued)

FOREIGN PATENT DOCUMENTS

EP 2489851 A1 8/2012

OTHER PUBLICATIONS

Hriadel, "Health Status Monitoring of Turbocharger for Passenger Vehicle Applications," Czech Technical University in Prague, 92 pages, Jan. 2019.

*Primary Examiner* — Loren C Edwards

(74) *Attorney, Agent, or Firm* — Seager, Tufte & Wickhem LLP

(57) ABSTRACT

Systems and controllers providing air-path controls in combustion engines. Some examples may be directed to use in gasoline engines including a turbocharger, whether mechanical-only or including electrical assist) and a low-pressure exhaust gas recirculation flow path. Control signals for a wastegate or variable nozzle turbine are generated from a turbocharger kinetic energy controller.

18 Claims, 7 Drawing Sheets

(56) References Cited

U.S. PATENT DOCUMENTS

| | | | |
|---|---|---|---|
| 10,309,281 | B2 | 6/2019 | Stewart et al. |
| 10,309,287 | B2 | 6/2019 | Pachner et al. |
| 10,415,492 | B2 | 9/2019 | Pachner et al. |
| 10,423,131 | B2 | 9/2019 | Santin |
| 10,503,128 | B2 | 12/2019 | Pekar et al. |
| 10,584,651 | B2 | 3/2020 | Beno et al. |
| 10,621,291 | B2 | 4/2020 | Pekar et al. |
| 10,672,202 | B2 | 6/2020 | Pekar et al. |
| 11,053,875 | B2 | 7/2021 | Pachner et al. |
| 11,156,180 | B2 | 10/2021 | Pekar et al. |
| 11,199,120 | B2 | 12/2021 | Pachner et al. |
| 11,408,332 | B2 | 8/2022 | Pekar et al. |
| 11,408,359 | B2 | 8/2022 | Hriadel et al. |
| 11,421,616 | B2 | 8/2022 | Poloni et al. |
| 11,421,619 | B2 | 8/2022 | Prochazka et al. |
| 11,434,843 | B1 | 9/2022 | Baramov et al. |
| 11,492,958 | B2 | 11/2022 | Herceg et al. |
| 11,506,138 | B2 | 11/2022 | Pachner et al. |
| 11,530,656 | B2 | 12/2022 | Pcolka et al. |
| 11,555,460 | B2 | 1/2023 | Poloni |
| 11,624,332 | B2 | 4/2023 | Pcolka et al. |
| 11,687,071 | B2 | 6/2023 | Poloni et al. |
| 11,698,014 | B1 | 7/2023 | Dickinson et al. |
| 11,719,174 | B2 | 8/2023 | Hriadel et al. |
| 11,732,670 | B2 | 8/2023 | Santin |
| 11,788,460 | B2 | 10/2023 | Keuler et al. |
| 11,788,461 | B2 | 10/2023 | Baramov |
| 2007/0079613 | A1 | 4/2007 | Greentree |
| 2009/0000298 | A1 | 1/2009 | Barthelet |
| 2009/0013687 | A1 | 1/2009 | Swenson et al. |
| 2009/0266073 | A1 | 10/2009 | Greentree |
| 2010/0292937 | A1 | 11/2010 | Hosny et al. |
| 2012/0245789 | A1 | 9/2012 | Ghoneim |
| 2013/0067915 | A1 | 3/2013 | Flynn et al. |
| 2014/0107885 | A1 | 4/2014 | Hagen et al. |
| 2015/0083096 | A1 | 3/2015 | Zagone et al. |
| 2016/0076438 | A1 | 3/2016 | Tabata et al. |
| 2016/0117427 | A1 | 4/2016 | Lindgarde et al. |
| 2016/0265468 | A1 | 9/2016 | Takayanagi et al. |
| 2017/0044971 | A1 | 2/2017 | Racca |
| 2017/0096952 | A1 | 4/2017 | Yu et al. |
| 2017/0152799 | A1 | 6/2017 | Lee et al. |
| 2018/0051638 | A1 | 2/2018 | Wang et al. |
| 2018/0106202 | A1 | 4/2018 | Dickson et al. |
| 2019/0226389 | A1 | 7/2019 | Byrd et al. |
| 2019/0385385 | A1 | 12/2019 | Davidson |
| 2019/0385386 | A1 | 12/2019 | Davidson |
| 2019/0385387 | A1 | 12/2019 | Davidson |
| 2020/0156675 | A1 | 5/2020 | Mangus et al. |
| 2020/0158038 | A1* | 5/2020 | Wang .................. F02D 41/0072 |
| 2020/0158051 | A1* | 5/2020 | Tutton .................. F02D 41/005 |
| 2021/0029319 | A1 | 1/2021 | McFarland et al. |
| 2022/0034370 | A1 | 2/2022 | Hedge et al. |

* cited by examiner

AIR-PATH COORDINATION IN AN ENGINE

CROSS REFERENCE TO RELATED APPLICATIONS

The present application claims the benefit of and priority to U.S. Provisional Patent Application No. 63/517,606, filed Aug. 3, 2023, titled AIR-PATH COORDINATION IN AN ENGINE, the disclosure of which is incorporated herein by reference.

BACKGROUND

Exhaust gas recirculation (EGR) is used in combustion engines to control emissions and reduce pumping losses. Inert gases from exhaust reintroduced to a combustion engine can, for example, limit high temperature conditions during combustion and thereby reduce the quantity of certain pollutants that result.

Charged air is compressed air and is introduced to the intake manifold of an engine for combustion. The use of charged air increases engine power and efficiency. Air can be charged using a compressor in the air intake flow path, such as the compressor of a turbocharger or supercharger.

In an implementation having a low pressure EGR flow path, the recirculated exhaust gas mixes with fresh air and passes through a compressor before passing through an intercooler and throttle on the way to the engine intake manifold. Each step of this flow path introduces control complexity, lag, and changes the characteristics of gasses flowing to the intake manifold. Rather than adding system cost, complexity and points of failure by providing additional pressure, temperature or other sensors at numerous locations, airflow and component models are often used to estimate conditions throughout the system. However, modelling the path and controlling the overall system to provide desired torque efficiently with well controlled emissions presents multivariable and nonlinear control problems. Embedded platforms used for engine control often have memory and processing limitations that require careful planning to ensure optimizing methods can in fact be implemented reliably and achieve desired goals.

New and alternative controller and/or control architectures, and methods of control are desired to enable optimization.

Overview

The present inventors have recognized, among other things, that a problem to be solved is the need for new and/or alternative approaches for air-path controls in combustion engines. Some examples may be directed to use in gasoline engines including a turbocharger (whether mechanical-only or including electric motor assist) and a low-pressure exhaust gas recirculation (EGR) flow path.

A first illustrative and non-limiting example takes the form of an engine system comprising: a combustion engine having one or more combustion cylinders, an intake manifold and an exhaust manifold; an air intake; a turbocharger comprising a compressor having a compressor outlet, the compressor adapted for compressing air into charged air and a turbine positioned to receive exhaust gas from the exhaust manifold, the turbine either being associated with a wastegate, or being a variable nozzle geometry turbine; a charge air cooler configured to cool charged air from the compressor outlet; a throttle controlling cooled charged air delivery from the charge air cooler to the intake manifold; a low pressure exhaust gas recirculation (EGR) flow path including an EGR valve for circulating exhaust gas exiting the turbine to the compressor, such that the charged air exiting the compressor outlet is a mix of fresh air with a burned gas fraction; an EGR valve pressure difference sensor, and a plurality of engine sensors; and a controller structure comprising: a throttle controller configured to receive a charge flow setpoint and issue a throttle position control signal to the throttle; a turbocharger kinetic energy controller configured to receive a turbocharger kinetic energy setpoint and an estimated turbocharger speed, and to issue either a wastegate position control signal or a variable nozzle turbine control signal; an EGR controller for receiving an estimate of EGR flow and an EGR flow setpoint and generating an EGR valve control signal to the EGR valve, an airpath coordinator configured to receive a desired torque signal and a burned gas fraction target and output each of the charge flow setpoint, the turbocharger kinetic energy setpoint, and the EGR flow setpoint; an EGR estimator configured to estimate EGR flow using a model of EGR flow and data from the EGR valve pressure difference sensor; and a turbo speed estimator configured to estimate turbo speed using a model of turbocharger operation and sensor data from the engine.

Additionally or alternatively, the airpath coordinator comprises a first model predictive control module and a second model predictive control module; the first model predictive control module is a reference governor that provides the turbocharger kinetic energy setpoint using a cost function operating on a first time horizon; the second model predictive control module is a throttle-EGR coordinator that receives airflow predictions from the first model predictive control module and provides the charge flow setpoint and the EGR flow setpoint using a cost function operating on a second time horizon; and the second time horizon is shorter than the first time horizon.

Additionally or alternatively, the turbine is a variable nozzle geometry turbine, and the turbocharger kinetic energy controller outputs a position signal to the variable nozzle geometry turbine.

Additionally or alternatively, the system includes a wastegate associated with the turbine, to allow exhaust gasses to bypass the turbine, and the turbocharger kinetic energy controller outputs a position signal to the wastegate.

Additionally or alternatively, the engine sensors include each of a fresh air pressure sensor, a fresh air temperature sensor, a compressor outlet pressure sensor, an intake manifold pressure sensor, an intake manifold temperature sensor, and a lambda sensor for sensing exhaust gas oxygen.

Additionally or alternatively, the combustion cylinders are configured to burn gasoline, and the controller is configured to target a stoichiometric ratio based on characteristics of gasoline.

Another illustrative and non-limiting example takes the form of a controller for an engine system, the engine system including a combustion engine having one or more combustion cylinders, an intake manifold and an exhaust manifold, an air intake, a turbocharger comprising a compressor having a compressor outlet, the compressor adapted for compressing air into charged air and a turbine positioned to receive exhaust gas from the exhaust manifold, the turbine either being associated with a wastegate, or being a variable nozzle geometry turbine, a charge air cooler configured to cool charged air from the compressor outlet, a throttle controlling cooled charged air delivery from the charge air cooler to the intake manifold, a low pressure exhaust gas recirculation (EGR) flow path including an EGR valve for circulating exhaust gas exiting the turbine to the compressor, such that the charged air exiting the compressor outlet is a mix of fresh air with a burned gas fraction, an EGR valve pressure difference sensor, and a plurality of engine sensors; the controller comprising: a throttle controller configured to receive a charge flow setpoint and issue a throttle position control signal to the throttle; a turbocharger kinetic energy controller configured to receive a turbocharger kinetic energy setpoint and an estimated turbocharger speed, and to issue either a wastegate position control signal or a variable nozzle turbine control signal; an EGR controller for receiving an estimate of EGR flow and an EGR flow setpoint and generating an EGR valve control signal to the EGR valve; an airpath coordinator configured to receive a desired torque signal and a burned gas fraction target and output each of the charge flow setpoint, the turbocharger kinetic energy setpoint, and the EGR flow setpoint; an EGR estimator configured to estimate EGR flow using a model of EGR flow and data from the EGR valve pressure difference sensor; and a turbo speed estimator configured to estimate turbo speed using a model of turbocharger operation and sensor data from the engine.

Additionally or alternatively, the airpath coordinator comprises a first model predictive control module and a second model predictive control module; the first model predictive control module is a reference governor that provides the turbocharger kinetic energy setpoint using a cost function operating on a first time horizon; the second model predictive control module is a throttle-EGR coordinator that receives airflow predictions from the first model predictive control module and provides the charge flow setpoint and the EGR flow setpoint using a cost function operating on a second time horizon; and the second time horizon is shorter than the first time horizon.

Additionally or alternatively, the turbine is a variable nozzle geometry turbine, and the turbocharger kinetic energy controller outputs a position signal to the variable nozzle geometry turbine.

Additionally or alternatively, the engine system includes a wastegate associated with the turbine, to allow exhaust gasses to bypass the turbine, and the turbocharger kinetic energy controller outputs a position signal to the wastegate.

Additionally or alternatively, the engine sensors include each of a fresh air pressure sensor, a fresh air temperature sensor, a compressor outlet pressure sensor, an intake manifold pressure sensor, an intake manifold temperature sensor, and a lambda sensor for sensing exhaust gas oxygen, and the controller is configured to receive outputs from each of the engine sensors.

Additionally or alternatively, the combustion cylinders of the engine are configured to burn gasoline, and the controller is configured to target a stoichiometric ratio based on characteristics of gasoline.

Another illustrative, non-limiting example takes the form of a method of operating an engine system, the engine system including a combustion engine having one or more combustion cylinders, an intake manifold and an exhaust manifold, an air intake, a turbocharger comprising a compressor having a compressor outlet, the compressor adapted for compressing air into charged air and a turbine positioned to receive exhaust gas from the exhaust manifold, the turbine either being associated with a wastegate, or being a variable nozzle geometry turbine, a charge air cooler configured to cool charged air from the compressor outlet, a throttle controlling cooled charged air delivery from the charge air cooler to the intake manifold, a low pressure exhaust gas recirculation (EGR) flow path including an EGR valve for circulating exhaust gas exiting the turbine to the compressor, such that the charged air exiting the compressor outlet is a mix of fresh air with a burned gas fraction, an EGR valve pressure difference sensor, and a plurality of engine sensors; and a controller structure comprising a throttle controller, a turbocharger kinetic energy controller, an EGR controller, an airpath coordinate, an EGR estimator, and a turbo-speed estimator, the method comprising: the throttle controller receiving a charge flow setpoint and issuing a throttle position control signal to the throttle; the turbocharger kinetic energy controller receiving a turbocharger kinetic energy setpoint and an estimated turbocharger speed, and issuing either a wastegate position control signal or a variable nozzle turbine control signal; the EGR controller receiving an estimate of EGR flow and an EGR flow setpoint, and generating an EGR valve control signal; the airpath coordinator receiving a desired torque signal and a burned gas fraction target, outputting each of the charge flow setpoint, the turbocharger kinetic energy setpoint, and the EGR flow setpoint; the EGR estimator estimating EGR flow using a model of EGR flow and data from the EGR valve pressure difference sensor, and issuing the estimate of EGR flow to the EGR controller; and the turbo speed estimator estimating turbo speed using a model of turbocharger operation and sensor data from the engine, and providing the estimated turbo speed to the turbocharger kinetic energy controller.

Additionally or alternatively, the airpath coordinator comprises a first model predictive control module and a second model predictive control module; the first model predictive control module is a reference governor that provides the turbocharger kinetic energy setpoint using a cost function operating on a first time horizon; the second model predictive control module is a throttle-EGR coordinator that receives airflow predictions from the first model predictive control module and provides the charge flow setpoint and the EGR flow setpoint using a cost function operating on a second time horizon; and the second time horizon is shorter than the first time horizon.

Additionally or alternatively, the turbine is a variable nozzle geometry turbine, and the turbocharger kinetic energy controller outputs a position signal to the variable nozzle geometry turbine.

Additionally or alternatively, the engine system includes a wastegate associated with the turbine, to allow exhaust gasses to bypass the turbine, and the turbocharger kinetic energy controller outputs a position signal to the wastegate.

Additionally or alternatively, the engine sensors include each of a fresh air pressure sensor, a fresh air temperature sensor, a compressor outlet pressure sensor, an intake manifold pressure sensor, an EGR valve pressure difference sensor, an intake manifold temperature sensor, and a lambda sensor for sensing exhaust gas oxygen.

Additionally or alternatively, the combustion chambers are configured to burn gasoline, and the airpath coordinator uses a stoichiometric ratio for gasoline.

This overview is intended to provide an introduction to the subject matter of the present patent application. It is not intended to provide an exclusive or exhaustive explanation. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
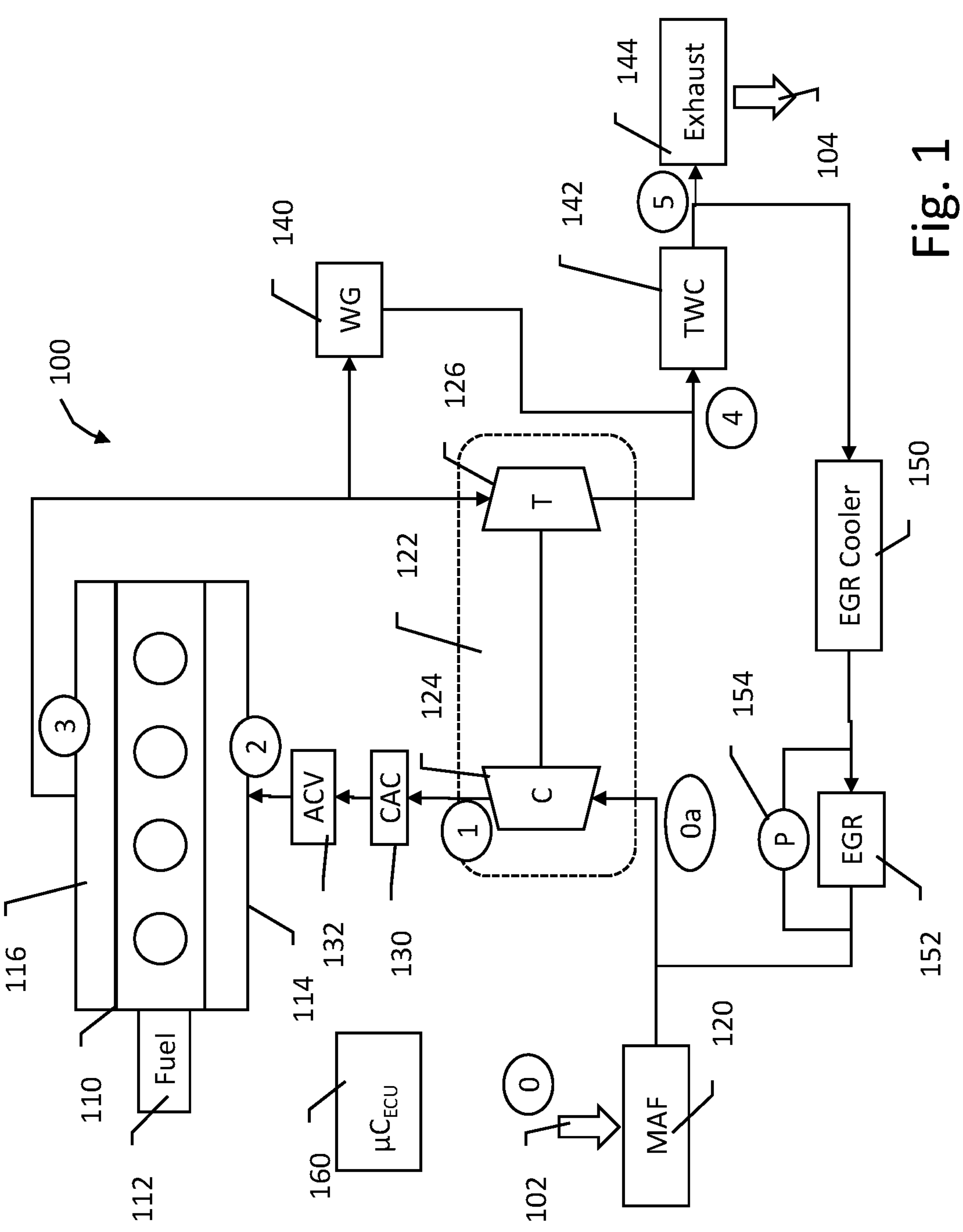
FIG. 1 shows an illustrative engine in schematic form.

FIG. 1 shows an illustrative engine system in block form. The system 100 includes an engine 110 having an (air) intake manifold 114, exhaust manifold 116 and a plurality of cylinders. The engine cylinders receive fuel input by fuel injectors 112. Each fuel injector is adapted to provide a variable charge of fuel for each cycle of the cylinder (generally). The amount of fuel injected is determined by a control signal.

The air system of the engine system 100 is shown in some detail. Ambient air 102 is received and filtered to remove particulates by an air filter (not shown). The quantity of incoming ambient air 102 is monitored with a mass air flow (MAF) sensor 120. The MAF sensor 120 determines a mass flow entering the system.

As used herein, when air passes through an element, the position before the air passes through the element is referred to as "upstream," and the position after the air passes through the element is referred to as "downstream." For example, as shown, air passes through the MAF sensor 120 and then goes to a compressor 124 of a turbocharger 122, therefore the compressor 124 is downstream of the MAF sensor 122, and the MAF sensor 122 is upstream of the compressor 124. Ambient air conditions may be sensed at position 0 with pressure, temperature and/or other sensors to determine, for example and without limitation, ambient air pressure, temperature and/or humidity.

In the example shown, the air passing through the MAF sensor 120 goes to the compressor 124 of turbocharger 122. The turbocharger 122 provides torque to the compressor 124 from a turbine 126 positioned downstream of the exhaust gas airflow from the engine exhaust manifold 116. Using this torque, the compressor 124 will compress the air flow, raising the pressure and temperature thereof. Once compressed, the air can be referred to as charged air. Air pressure at the inlet of the compressor 124 (position 0a) can be estimated from a model using the output of the MAF sensor 120 and ambient conditions at position 0. In some configurations, a pressure sensor may be provided at the outlet of the compressor 124, providing a boost pressure measurement for position 1. In some other configurations the pressure at position 1 may be calculated or estimated from a model using, for example a throttle model and a sensed pressure at the intake manifold 114 of the engine 110. Some of the features of modelling and measuring are discussed further below after discussion of exhaust gas recirculation is introduced.

To enhance efficiency of the engine 110 (and limit temperature extremes) the compressed air exiting the compressor 124 passes through a charge air cooler (CAC) at 130. Downstream of the CAC 130 is an adjustable choke valve (ACV), which serves as the throttle 132 in the system 100. A recirculation valve (RCV) may be included, if desired, though one is omitted in FIG. 2. The RCV may be placed to allow recirculation of the output of the compressor (such as after any of the compressor 124, or CAC 130) back to the compressor 124 inlet, enabling prevention of turbocharger surge and operating to reduce pressure at the compressor outlet if the throttle 132 is closed, for example.

Air passing through the throttle 132 goes to the engine intake manifold 114, which is marked as location 2 as shown. An intake manifold absolute pressure sensor and temperature sensor are provided at the intake manifold, providing pressure and temperature readings at position 2. The charged, cooled and throttled air enters the cylinders of the engine 110, where combustion with fuel injected by the fuel injector 112 occurs. Following combustion, the air, now mixed with fuel (at least some of which has combusted) exits the engine at the exhaust manifold 116.

Temperature at the exhaust manifold 116, marked as location 3, as shown, can be estimated according to a model by using the measured conditions at location 2 along with engine speed and fuel injection parameters, where the engine speed is measured by well-known magnetic measuring device, and fuel injection parameters are obtained from the fuel injector 112 control signal. Further inputs for estimating temperature at location 3 may include estimated charge mass flow and, typically, using ignition angle and air-to-fuel ratio. Although pressures and temperatures along the exhaust side of the system 100 may be measured if desired, this is not typically the case. Instead the exhaust side temperatures and pressures are typically estimated using an air path model, accounting for individual component models described below and can be computed by solving a set of equations which are then solved iteratively.

The exhaust gasses from the exhaust manifold 116 are directed back to the turbocharger 122 and power the turbine 126. As the exhaust air passes through the turbine 126, the turbine 126 spins and drives the compressor 124. The turbine 126 and/or compressor 124 of the turbocharger 122 may include variable geometries, if desired. For example, turbine 126 may be a variable nozzle turbine (VNT). An electric motor (E-Turbo) may, optionally, be provided to enhance operation of the turbocharger 122, particularly at low engine speeds where the turbine 126 may not provide sufficient force to the drive the compressor 124 to sufficiently charge the airflow.

A wastegate (WG) 140 is provided to control the turbocharger 122. In the design shown, the WG 140 is a controllable valve that selectively allows exhaust gasses from the exhaust manifold 116 to bypass the turbine 126. The WG can be used to control turbocharger speed. To increase turbocharger 122 speed, the WG 140 valve position is modified (closed) to reduce the quantity of gas passing through the WG 140; conversely, to reduce turbocharger 122 speed, the WG 140 position is modified (opened) to allow more gas through the WG 140, rather than through the turbine 126. VNT and WG are typically alternatives to one another, and usually only one of the two will be included in a given design. If the turbine 126 is a VNT, closing the nozzle restricts exhaust gasses to the turbine, reducing power received by the turbine 126 and decreasing turbocharger speed; conversely, opening the nozzle passes more exhaust gasses to the turbine and increases turbocharger speed. Effects of WG and VNT control mechanisms on the speed of turbocharger 122 are subject to lag due to the rotational inertia of the turbocharger 122.

Pressure and temperature at location 4, exiting the turbine 126, can be estimated from an iterative solver, determining estimates in a counter-flow manner starting from ambient pressure at the exhaust port (tail pipe, for example) and working backward to the exhaust manifold for pressures, and for temperatures starting with the (estimated/modeled) exhaust manifold temperature and working downstream to positions 4 and 5. After exiting the turbine, the exhaust gasses are subjected to after-treatment, here shown as a three-way catalytic (TWC) converter unit 142. The design shown may be for a gasoline engine; different and/or additional aftertreatment components may be included for other fuels. For example, a diesel engine may include a particulate filter, NOx trap, etc., as desired.

An exhaust gas recirculation (EGR) system is provided, with an EGR cooler 150 and an EGR valve 152, coupled to the exit of the TWC 142; as an alternative, the EGR flow path may couple to the inlet of the TWC 142 if desired. The exhaust gasses are first cooled by the EGR cooler 150 and then pass through the EGR valve 152. By recirculating exhaust gasses, the composition of the airflow into the compressor 124 can be controlled. The EGR system enables introduction of inert gasses into the combustion chamber of the engine, and reduces the combustion temperature therein, which can avoid or reduce the production of certain pollutants. EGR may also be used in a gasoline engine to reduce throttling or pumping losses and/or engine knocking. In the context of a diesel engine, EGR can be useful to reduce certain environmentally harmful emissions, particularly NOx. Some examples may use a three-way EGR valve that controls both airflow from the MAF sensor and airflow from the EGR cooler 150.

A low pressure EGR system is shown, recirculating exhaust gasses after exiting the turbine 126. Low pressure EGR is relatively more common in gasoline engines. A high pressure EGR (which recirculates exhaust gas from the exhaust manifold 116 to the intake manifold 114) may be provided in diesel engines. Both high and low pressure EGR may be present in one system, if desired. The following examples are directed to a system having a low pressure EGR system.

With the configuration shown, temperature at the intake of the compressor 124 is computed, in the case of the presence of low pressure EGR 152, from enthalpy balance of mixing fresh air of known mass flow (given by the MAF sensor 102) and ambient temperature, and recirculated exhaust gas having a temperature that may be sensed at the inlet of the EGR valve 152 or estimated using a heat exchanger model for the EGR cooler 150 and the temperature calculated for position 4 or 5. The mass flow of the recirculated gas is estimated from EGR valve inlet and outlet pressures, EGR gas temperature and EGR actuator position. Some examples may include a pressure differential sensor 154 coupled across the EGR valve 152. The pressure at the compressor 124 outlet may be measured by a boost pressure sensor, if desired.

Exhaust gasses that are not recirculated by the EGR valve 152 pass to the exhaust 144. A Fuel-Air Mix (FAM) or Lambda sensor may be provided as part of the exhaust 144. The Lambda sensor may include, for example and without limitation, a universal exhaust gas oxygen (UEGO) sensor, and/or other sensors. The Lambda sensor in some examples is configured to output a measurement relative to an air-fuel equivalence ratio, usually denoted the symbol Lambda (k) and measures the proportion of oxygen (O2) in the exhaust gasses. Pressure and/or temperature at position 5 may be modeled using the known geometry of the various system components and the pressure and temperatures calculated for position 4, among other data inputs.

As can be seen, the system is complex, including various mixing steps, models of valves and other components, and encompasses various time delay issues as well. Models of the various components and combination of components are typically constructed using additional test sensors that are omitted from production builds of the engine system. Such models are used, as noted variously in the above discussion, to estimate pressures, temperatures and mass flows throughout the system where test system sensors are omitted. That is, for example, models for pressures and temperatures at positions before and after various components can be developed by using added sensors in a test setup, and varying operating conditions to develop models of operation within various bounds.

In view of these complexities, certain solvers are often used for estimating conditions in the system, and also track various errors/uncertainties in both measurement and estimation. Iterative solvers and Kalman filters are often used. Model Predictive Control (MPC) is also used.

Control solutions are often generated by minimizing the distance of operating variables from one or more target output values for the controllable outputs or physical plant operating characteristics by modelling future states of the system over a time horizon. For example, the targets may be any of target turbocharger speed, target boost pressure, target pressure difference over the compressor, target air mass flow, target gas compositions, or a combination thereof. With MPC functions, the distance to target or reference values for the one or more output values (or resulting operating characteristics) is minimized, thus optimizing performance. This is achieved by treating the distance to target variables as a cost, and then minimizing cost over a time horizon. As an example, an MPC cost function formation may be as shown in Equation 1:

$$J_{MPC} = \min \sum_{k=1}^{P} \|y_{r,k} - y_k\|_{W_1} + \|u_{d,k} - u_k\|_{W_2} \qquad \text{[Eq. 1]}$$

Where $u_{d,k}$ corresponds to the desired profile for the manipulated variable, $u_k$ stands for the manipulated variable, k denotes discrete time instance, and P stands for the prediction horizon of the predictive controller. In this example, $y_{r,k}$ and $y_k$ represent the output reference and measured value, respectively, and $W_1$ and $W_2$ specify weighting terms. The MPC cost function is minimized in operation in order to provide optimal control to the physical plant, and a controller may use MPC accordingly.

In another example, a PID control method can be used to account for each of proportional, integral, and derivative differences from a target operating point. A target operating point for PID control may use a single value, such as compressor boost pressure, or may use a plurality of values such as compressor speed and compressor boost pressure, while controlling other factors (actuator positions, for example) to direct operations to maintain such target(s). The proportional difference may indicate current state, integral difference may identify a process shift over time, and derivative difference may indicate the direction of changes in operation. With PID control, a proportional difference is minimized while monitoring to ensure that the integral and derivative differences do not indicate changing performance which may, after further iterations, cause the proportional difference to increase. The control parameters output to the actuators are, for a PID controller, adjusted to reduce or minimize the distance of actual performance from one or more targets on an iterative basis. PID control may incorporate multiple different target operating characteristics. The controller may use PID control instead of MPC, for example. LQR control may be used instead, if desired, applying similar concepts.

One approach is to provide all the system models into a single engine control unit (ECU 160) as an overall controller, and then to calculate both current system state and control signal values from that single ECU. Doing so, however, would require an ECU with far greater computational and memory capabilities than are typically provided in an engine, and would require an expensive ECU to handle all problems. In some examples, a more distributed approach is used, as shown by the control architecture of FIG. 2.

Figure 2:
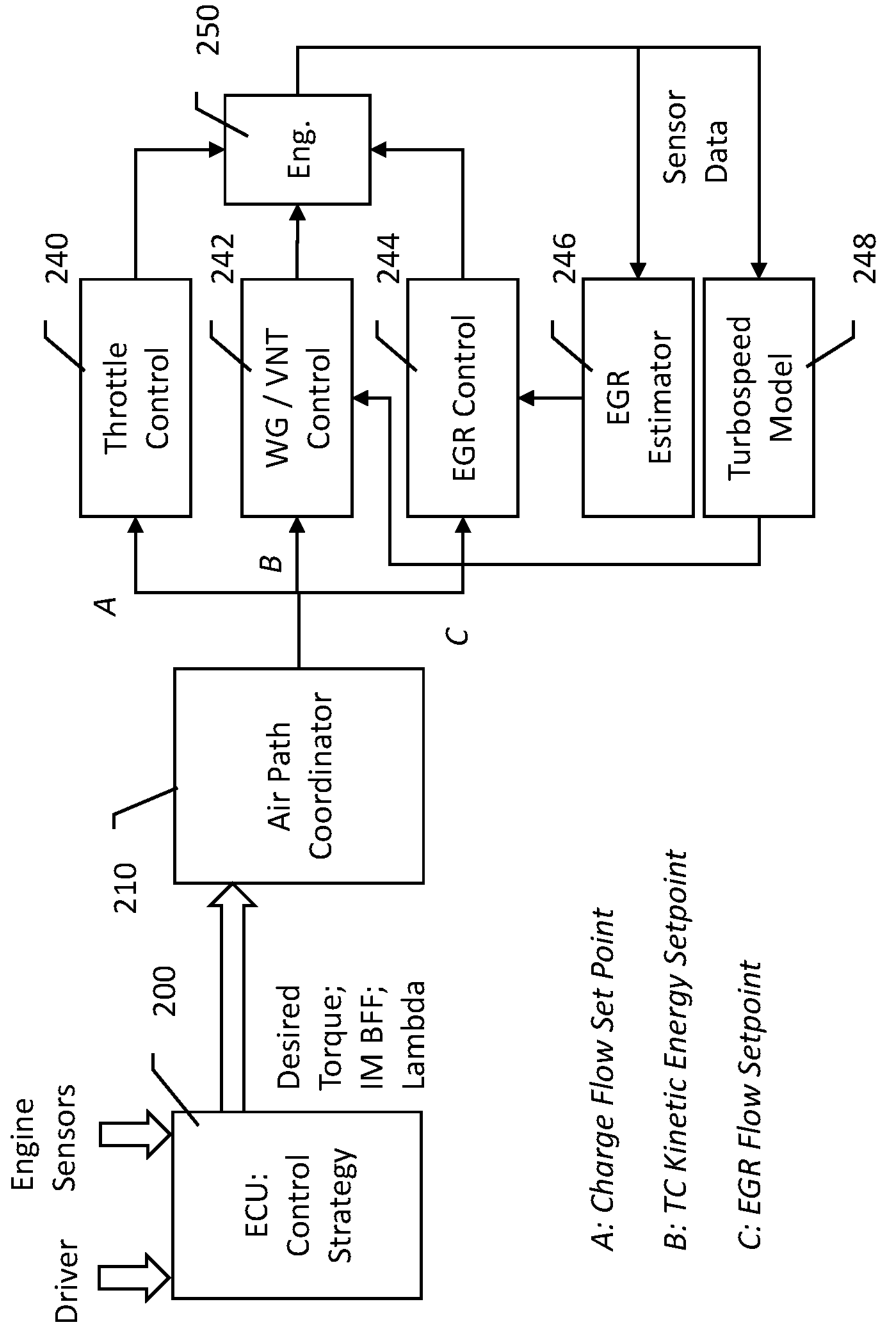
FIG. 2 shows a control architecture with several controller modules in block form.

FIG. 2 shows a control architecture with several controller modules in block form. An ECU 200 receives control signals from a driver, which may include, for example, desired acceleration/speed signals from a gas pedal as well as steering decisions, which can add extra torque demands. Driver inputs may be from a human driver, a cruise controller using speed setpoints, or an autonomous or semi-autonomous drive module. The ECU 200 also receives inputs from engine sensors such as, for example and without limitation, measurements of engine speed, Lambda sensor outputs, modeled or measured turbocharger speed, temperatures and pressures throughout the system, etc.

The ECU 200 then determines desired engine torque, a target intake manifold (IM) burned gas fraction (BGF), and a desired Lambda sensor target for residual O2 in the exhaust. For example, desired engine torque may be determined from vehicle weight and steering factors, as well as the extent to which the driver is requesting added velocity by depressing the gas pedal. Target IM BGF may be determined using a model of exhaust contaminants that considers fuel injection, combustion temperature, torque load, etc. The target Lambda sensor value may be determined from environmental demands external to the system (such as legal pollutant limits), desired efficiency, engine state (cold start, warm start, etc.), and catalyst or catalyst bed temperature, for example.

An air path coordinator 210 is provided in the example of FIG. 2. The air path coordinator 210 receives from the ECU 200 the desired engine torque, IM BGF target, and Lambda targets. The air path coordinator 210 is further explained in the examples of FIGS. 3-7, below. The air path coordinator 210 has the role of translating these high-level ECU commands into low level controller setpoints. In the example shown, the low-level controller setpoints include A) Charge Flow Set Point, B) Turbocharger (TC) Kinetic Energy Setpoint, and C) EGR Flow Setpoint. Setpoint A is provided to a throttle control block 240, which controls throttle position in the engine 250 by issuing a control signal to the throttle. Setpoint B is provided to the WG/VNT Control block 242, which issues a control signal to open, close or maintain the position of the WG and/or VNT associated with the engine 250. Setpoint C is provided to the EGR control block 244, which controls the position of the EGR by opening, closing, or maintaining the EGR valve position.

The sensors in the engine 250 are used to generate sensor data that is used by an estimator and a model. The EGR estimator 246 use a model of the EGR, as well as sensed data, to estimate EGR mass flow. This output estimate of EGR flow is then compared by the EGR control block 244 to setpoint C to determine whether to issue a control signal to open, close, or maintain the EGR valve position. The turbocharger speed model 248 is used to estimate the speed of the turbocharger. An example of a turbocharger speed model to estimate turbocharger speed can be found in US PG Pat. Pub. 2021/0293193, for example, by using a measurement or estimate of mass flow into the compressor inlet, an estimate or measurement of compressor inlet pressure, and an estimate or measurement of pressure at the compressor outlet, along with a model of the compressor itself; additional temperature measurements or estimates may also be used. In an example, the compressor outlet pressure may be estimated by the use of the IM pressure signal from the engine, working backward using flow models for the throttle and CAC.

The turbocharger speed signal is used in the WG/VNT control block to estimate the current kinetic energy being obtained by the turbocharger. The current kinetic energy is compared to setpoint B by the WG/VNT control block 242 to determine whether to increase kinetic energy to the turbocharger by closing the WG or opening the vanes of the VNT, to maintain kinetic energy to the turbocharger by holding position of the WG or VNT, or to reduce kinetic energy to the turbocharger by opening the WG or closing the vanes of the VNT. For example, the EGR Estimator block 246 may perform sensor fusion using, for example, models to reconstruct the EGR mass flow signal using the Lambda signal, and turbocharger speed. In another approach, the EGR Estimator block 246 may compute EGR mass flow based on an EGR valve model (calculated, for example, in bench/controlled testing) and estimated pressures at the valve inlet and valve outlet, along with estimated or measured gas temperatures at the EGR valve inlet. For further examples, U.S. Pat. No. 10,309,287, the disclosure of which is incorporated herein by reference, provides additional details on the estimation by inference of various pressures, temperatures and mass flows in an engine airflow system.

The control solution can now be distributed, with blocks 240, 242, and 244 implemented in relatively simple controllers that adjust a valve position in response to a setpoint and a monitored signal. Blocks 246 and 248 are also implementable in relatively simple controllers that perform a small number of calculations on a repeating basis. The coordinator 210 may include a control architecture as shown in FIG. 3, below.

Each ECU and/or controller discussed herein can take many forms, including, for example, a microcontroller or microprocessor, coupled to a memory storing readable instructions for performing methods as described herein, as well as providing configuration and/or model data for the various examples that follow. Such ECUs and controllers may include one more application-specific integrated circuits (ASIC) to provide additional or specialized functionality, such as, without limitation a signal processing ASIC that can filter received signals from one or more sensors using digital filtering techniques. Logic circuitry, state machines, and discrete or integrated circuit components may be included as well. The skilled person will recognize many different hardware implementations are available for an ECU and/or controller. The system may also include, be part of, or communicate with an advanced control framework as disclosed in US PG Pat. Pub. No. 2022/0343702, titled ADVANCED CONTROL FRAMEWORK FOR AUTOMOTIVE SYSTEMS, the disclosure of which is incorporated herein by reference.

Figure 3:
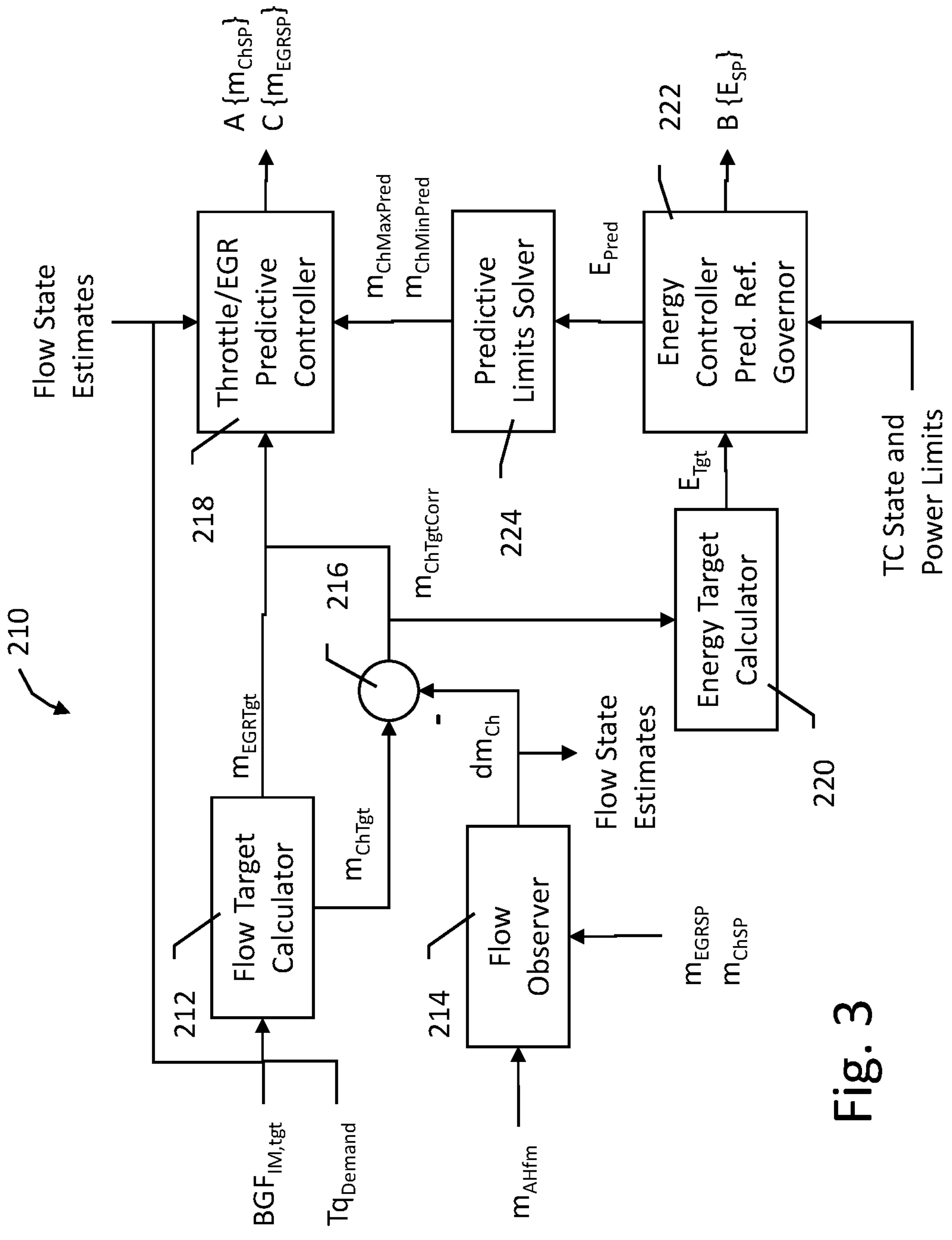
FIG. 3 illustrates a control architecture for the airpath coordinator of FIG. 2.

FIG. 3 illustrates a control architecture for the airpath coordinator of FIG. 2. An overview is provided, and a detailed discussion of each block follows below. A flow target calculator provides an EGR mass flow target to a throttle and EGR predictive controller 218. A flow observer 214 obtains various measured or modeled mass flows from existing/prior operating states, and generates a flow disturbance value $dm_{Ch}$ to provide offset-free air mass flow, as well as flow state estimates; the flow observer may be a Kalman filter-based estimator. Using the data from the flow target calculator 212 and the flow observer 214, a difference calculator 216 determines a corrected charge air mass flow target, $m_{ChTgtCorr}$ which is provided to the throttle and EGR predictive controller 218, as well as an energy target calculator 220. The energy target calculator determines a target kinetic energy on the turbocharger, $E_{Tgt}$, which is provided to an energy controller predictive reference governor 222. The energy controller predictive reference governor 222 uses the target kinetic energy, as well as data regarding turbocharger current state (estimated speed, and status of WG and/or VNT positions) to calculate setpoint B, the turbocharger kinetic energy setpoint. A prediction of the turbocharger kinetic energy is also generated at the energy controller predictive reference governor 222, and provided to a predictive limit solver 224, which then generates predicted maximum and minimum charged air mass flow values. The throttle and EGR predictive controller 222 receives each of the EGR target mass flow, corrected charge air mass flow target, minimum and maximum predicted charge mass limits, flow state estimates from the flow observer 214, and the EGR demand and torque demand setpoints, and then calculates each of setpoints A, for charge mass setpoint, and C, for EGR mass flow setpoint.

Turning back to the individual blocks of FIG. 3, the air path controller 210 receives the torque demand (shown as $Tq_{Demand}$) and the IM BGF target (shown as $BGF_{IM,tgt}$) which are provided to a flow target calculator 212. The flow target calculator uses an engine power model, such as shown here to determine fuel mass needed to achieve the torque demand:

$$P_e = \frac{\pi}{30} T_q \cdot N_e = LHV \cdot m_F \cdot \eta$$

Where $P_e$ is the engine power, $T_q$ is engine torque, $N_e$ is the engine rotational speed in revolutions per minute, LHV is the lower heating value of fuel, $m_F$ is the fuel mass flow, and f is the engine efficiency (specific to each engine and generally provided by the manufacturer and/or developed at a test station). Combustion stoichiometry then used to determine target air mass flow, $m_{ATgt}$, as shown here:

$$m_{ATgt} = \frac{\pi \cdot T_{qDmd} \cdot N_e \cdot r_{st} \cdot \lambda_{map}(N_e, T_{qDmd})}{30 \cdot LHV \cdot \eta(N_e, T_{qDmd})}$$

Where $T_{qDmd}$ is the torque demand, $r_{st}$ is the air-fuel stoichiometric ratio (about 14.7 for gasoline), and $\lambda_{map}$ is the Lambda sensor output desired as a function of engine speed and torque demand. With the total target air mass flow known, the target (fresh) air flow and EGR mass flow can be determined using the IM BGF target:

$$m_{ChTgt} = \frac{1}{1 - BGF_{IM,tgt}} \cdot m_{ATgt}$$

$$m_{EgrTgt} = \frac{BGF_{IM,tgt}}{1 - BGF_{IM,tgt}} \cdot m_{ATgt}$$

As shown in FIG. 3, the target EGR mass flow, $m_{EGRTgt}$ is provided to the throttle/EGR predictive controller 218, and the target fresh air charge flow is provided to a difference calculator 216, which receives a second value from the flow observer 214.

The flow observer 214 may be implemented as a Kalman filter-based estimator and is used for data reconciliation between the airflow model and measured parameters throughout the system. A flow observer 214 obtains various measured or modeled mass flows from existing/prior operating states, and generates a flow disturbance value $d_{mCh}$ to provide offset-free air mass flow, as well as flow state estimates. A more detailed discussion is below with respect to FIG. 7.

The energy target calculator 220 receives the corrected charge air mass flow target, $m_{ChTgtCorr}$ and calculates a target kinetic energy, $E_{Tgt}$. Operation in block 220 starts with a charge flow model:

$$m_{Ch} = F_{VE}(N_e, p_2, T_2, vvt)$$

That is, the mass of charge air is a function of the engine speed, $N_e$, pressure and temperature at the intake manifold, $p_2$, $T_2$, and Variable Valve Timing (vvt). A dynamic inversion is performed on this function as part of the configuration of the energy target calculator, where the function may be, for example, converted to a polynomial, so that the intake manifold pressure can be calculated using the inversion:

$$p_2 = F_{VE}^{-1}(N_e, m_{Ch}, T_2, vvt)$$

Inserting the charge mass target to this formula and providing a lower bound, the boost pressure target can be calculated as the maximum of the following:

$$p_{BoostTgt} = \max(p_{1min}, F_{VE}^{-1}(N_e, m_{ChTgt}, T_2, vvt))$$

Where $p_{1min}$ is a minimum boost pressure for the case that the turbocharger power is minimal, for example, with the WG fully open (if wastegate is present) or vanes fully open (if a variable nozzle or variable geometry turbine). The turbocharger speed target is then calculated using a compressor flow model, that is:

$$m_{Ch} = F_C(N_{TC}, p_{0a}, p_1, T_{0a})$$

Where $p_{0a}$ and $T_{0a}$ are the compressor inlet pressure and temperature, $p_1$ is the compressor outlet pressure/boost pressure, and $N_{Tc}$ is the turbocharger speed. As noted, while models may be used to estimate $p_1$, such as by working backwards from p2 (engine intake manifold) and using a flow model for each of the throttle and CAC, some examples instead have a pressure sensor at the compressor outlet, allowing $p_1$ to be measured. Inversion of the compressor flow model yields the estimated current turbocharger speed:

$$N_{Tc} = F_C^{-1}(m_{Ch}, p_{0a}, p_1, T_{0a})$$

The turbocharger speed target can also be generated using the same inversion, and inserting the boost pressure target for $p_1$:

$$N_{TcTgt} = F_C^{-1}(m_*, p_{0a}, p_{BoostTgt}, T_{0a})$$

Where either $m_*$ is the charge mass target, $m_{ChTgt}$, if p1 is well away from the boost target pressure, or the calculated charge mass, $m_{Ch}$ if p1 is close to the boost pressure target. In an example, $m_*$ may be calculated from a fusion type formula:

$$m_* = A * m_{ChTgt} + (1 - A) * m_{Ch}$$

Where A is a variable between 0 and 1, and is a function of the difference between $p_1$ and $p_{BoostTgt}$. The turbocharger energy target is also calculated, as shown here:

$$E_{Tgt} = \frac{1}{2}J\left(\frac{N_{TcTgt}\cdot\pi}{30}\right)^2$$

Where J is the moment of inertia of the turbocharger wheel. If the energy target is outside of prescribed energy limits for the turbocharger, the energy target calculator may deactivate boost control, if needed.

Figure 4:
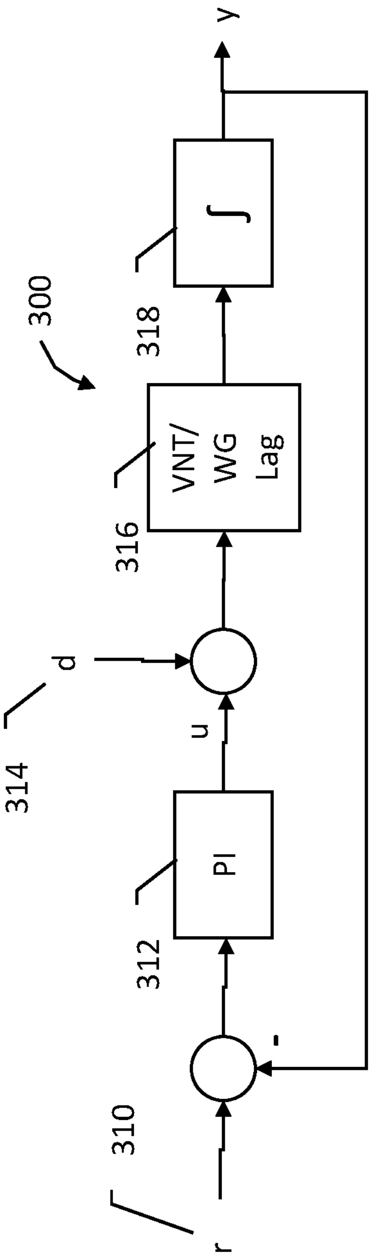
FIG. 4 illustrates aspects of the energy controller of FIG. 3.

The energy target, $E_{Tgt}$, is then provided to the energy controller predictive reference governor 222, which also receives turbocharger state and turbocharger power limits. The reference governor 222 will track the energy target it receives from the energy target generator 220 as closely as possible. The reference governor 222 is to generate the setpoint for use by the energy controller, and prevents turbocharger overspeed conditions. In an example, a model predictive control (MPC) is used as the energy reference governor. FIG. 4 illustrates aspects of the energy controller of FIG. 3 and is now referenced.

In FIG. 4, an internal model that includes the energy loop-controller is used. Wastegate actuator dynamics, or VNT actuator dynamics, are considered, as shown in FIG. 4. The energy setpoint, $E_{SP}$ is input as r at 310, and a difference relative to the turbocharger energy, y is calculated and entered to a proportional/integral controller 312, which provides the desired acceleration power u. The energy disturbance, d is also calculated using a separate, dedicated Kalman filter monitoring the turbocharger energy by comparing exhaust-side models to intake side models of the airflow system to accumulate model discrepancies and sensor errors. The effect of actuator lag, whether VNT or WG, is accounted at 316, and the effect of these disturbances is summed as indicated at 318, thus aiding in model tracking as between the turbocharger energy setpoint 310 and the turbocharger energy, y.

The cost function for the MPC of the reference governor may include the following five terms:

$\Sigma_{k\in I_y} w_1(k)(r(t+k)-r_{des}(t+k))^2+$ {Target Tracking by Ref. Gov. Output}

$\Sigma_{k\in I_r} w_2 \Delta r(t+k)^2+$ {Smoothness}

$\Sigma_{k\in I_y} w_3(k)(z_y(t+k)-y(t+k))^2+$ {Overspeed−soft constraint}

$\Sigma_{k\in I_u} w_4(k)(z_u(t+k)-u(t+k))^2+$ {Controller output−soft constraint}

$\Sigma_{k\in I_y} w_5(k)(y(t+k)-r_{des}(t+k))^2$ {Target Tracking by Energy}

The cost function as the sum of each of these five terms is minimized by the MPC over the time horizon. For example, a quadratic problem solver may be used. Constraints may be as follows:

$y_{min} \le r(t+k) \le y_{max} \forall k \in I_r$ $y_{min} \le z_y(t+k) \le y_{max} \forall k \in I_y$ $u_{min}(t) \le z_u(t+k) \le u_{max}(t) \forall k \in I_u$ The energy setpoint, y, that minimizes the cost function, respecting all constraints, is the output kinetic energy setpoint, $E_{SP}$, referred to also as setpoint B in the figures. The resultant sequence of predicted energy states, that is, y(t+k) for k=1,2, . . . n, is then shared with the EGR/Throttle predictive controller 218 via the predictive limits solver 224 as shown in FIG. 3.

The predictive limits solver 224 receives the sequence of predicted energy states, as noted. The role of the predictive limits solver 224 is to compute bounds for the charge flow to be used in the EGR/Throttle predictive controller 218. Maximum charge flow is calculated by assuming a fully open throttle, that is, with a wide-open-throttle (wot) condition. The charge mass flow and boost/manifold pressure satisfy two equations, an engine flow equation and a compressor flow equation:

$m_{chMaxWot}=F_{VE}(N_e,p_{1WOT},T_2,vvt)$ 1. Engine flow equation $m_{chMaxWot}=F_C(N_{Tc},P_{0a},P_{1WOT},T_{0a},$ 2. Compressor flow From these two flow equations, one can first obtain $p_{1WOT}$, assuming that the two equations are equal to one another. As the Throttle/EGR Predictive Controller 218 requires limit estimates over the prediction horizon, the process of computing the maximum charge flow limit may be executed for all samples over the prediction horizon, using predicted turbo speed values. The predicted speed of the turbocharger is based on the reference governor energy predictions received from the reference governor 222.

Figure 5:
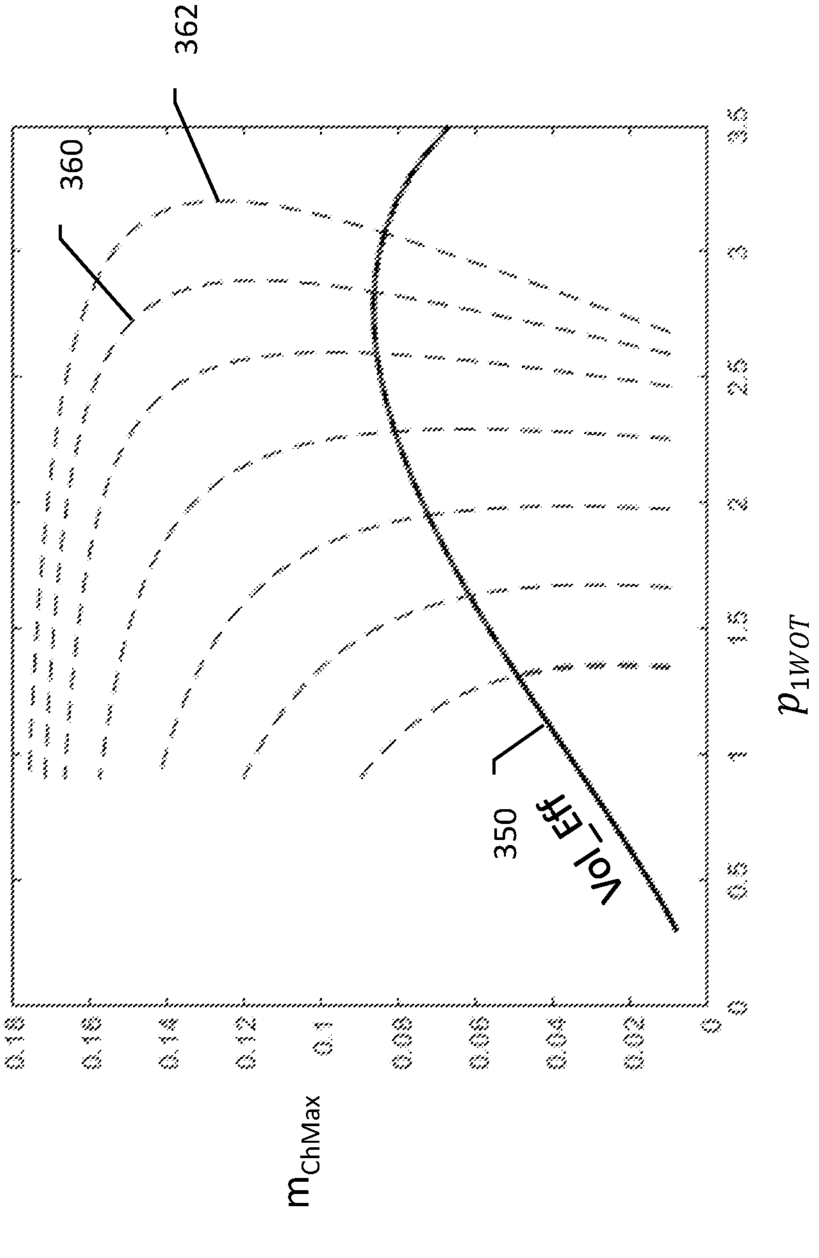
FIG. 5 shows a mapping of charge flow and pressure used for predicting limits.

FIG. 5 shows a mapping of charge flow and pressure used for predicting limits. Here, the x-axis has the wide-open throttle compressor outlet pressures, and the maximum charge flow is on the y-axis. The maximum volumetric efficiency follows line 350, and broken lines 360, 262 correspond to turbocharger speeds. The mapping in FIG. 5 would be the result of test stand operations for various mass flows and compressor speeds operating with the throttle wide open.

Next, the maximum charge flow is estimated:

$m_{ChmaxP}=P_{cmax}(C_p(T_1-T_{0a}))$

Where Pcmax is the maximum available compressor power, which would be proportional to the maximum available turbine power. The maximum turbine power, Pcmax, can be calculated separately by the boost controller using a turbine model and signal estimations or measurements and the specific heat capacity of the compressor inlet gas.

The reported maximum charge mass can be selected as follows:

$m_{Chmax}-\min(m_{ChmaxP},m_{ChmaxWot})$

The minimum charge flow limit is determined from several limits and assumes a fixed turbocharger speed, using the following:

$m_{Ch} \ge m_{ChBstLim}$ a)Preventing over-boost $m_{Ch} \ge m_{ChSrg}$ b)Preventing compressor surge $m_{Ch} \ge m_{ChThr0}$ c)Fully closed throttle The minimum mass flow for preventing overboost can be calculated as a function of turbocharger speed, inlet pressure, maximum outlet pressure, and inlet temperature:

$m_{ChBstLim}=F_C(N_{Tc},p_{0a},p_{1Max},T_{0a})$

The function here is from test/modelling of the turbocharger compressor. Surge limits likewise are generated from test/modelling of the system:

$m_{ChSrg}=F_S(p_{0a},p_{1srg},T_{0a})$

The surge line, known from the compressor map, may also be characterized according to turbocharger speed:

$m_{ChSrg}=F_{S2}(p_{0a},N_{TC},T_{0a})$

The fully closed throttle limits may be determined from the following set of flow equations, assuming that each of $p_{2Thr0}$, $P_{1Thr0}$ and $m_{ChThr0}$ are each unknown:

$m_{ChThr0}=F_{VE}(N_e,p_{2Thr0},T_2,vvt)$ Engine flow $m_{ChThr0}=F_T(p_{1Thr0},p_{2Thr0},T_2,0)$ Throttle flow $m_{ChThr0}=F_C(N_{TC},p_{0a},P_{1Thr0},T_{0a})$ Compressor flow Where each function is again a result of test stand characterization of the system. The minimum charge flow is the maximum of the above calculated minimum engine flow, minimum throttle flow, and minimum compressor flow:

$m_{ChMin}$–$\max(m_{ChThr0},m_{ChSrg},m_{ChBstLim})$

The minimum and maximum charge limits are provided by the predictive limits solver 224 to the throttle/EGR predictive controller 218.

Figure 6:
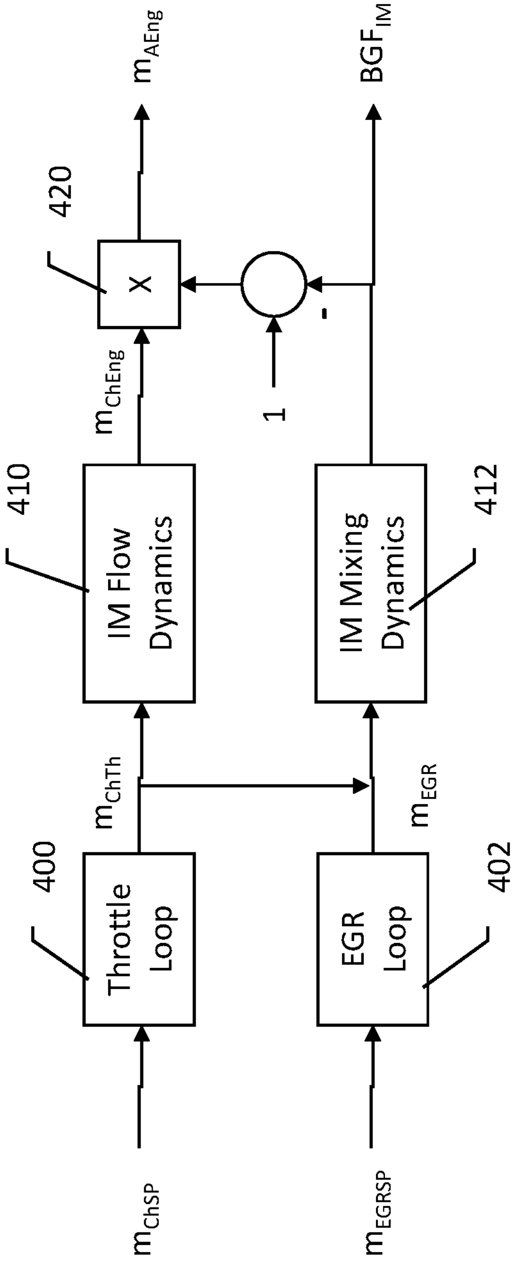
FIG. 6 shows a model structure for a predictive coordinator for throttle and EGR control.

FIG. 6 shows some details of the underlying operation of the throttle/EGR predictive controller. An internal prediction model is provided with pre-designed loop dynamics as shown in FIG. 6. The charge mass setpoint is provided to a throttle loop 400, and the EGR mass setpoint is provided to an EGR loop 402. The throttle loop 400 uses the following:

$$\frac{dm_{Ch}}{dt} = \frac{1}{\tau_c}m_{Ch} + m_{ChSP}$$

Here, the time constant $\tau_c$ is determined from test data on the engine. Next, the EGR loop 402 uses the following:

$$\frac{dm_{Egr}}{dt} = \frac{1}{\tau_E}m_{Egr} + m_{EgrSP}$$

The output of the throttle loop, $m_{ChTh}$, is passed to a block 410 for intake manifold flow dynamics, which uses the following:

$$\begin{aligned} Tmix\quad \dot{x}_0 &= \frac{1}{M_0(p_0,\,T_0)}(m_{EGR} - m_{Ch}\cdot x_0) \\ CAC\quad \dot{x}_1 &= \frac{m_{Ch}}{M_1(p_1,\,T_1)}(x_0 - x_1) \\ IM\quad \dot{x}_2 &= \frac{m_{Ch}}{M_2(p_2,\,T_2)}(x_1 - x_2) \end{aligned}$$

These dynamics provide an understanding of EGR fraction (burned gas fraction, BGF) after the mixer, CAC and inside of the intake manifold. Then the IM flow pressure dynamics can be characterized. Staring with the ideal gas law:

$$\frac{dp_2}{dt} = \frac{T_2R\gamma}{V_{IM}}(m_{ChThr} - m_{ChEng}) = \frac{T_2R\gamma}{V_{IM}}(m_{ChThr} - F_{VE}(N_e,\,p_2,\,T_2,\,vvt))$$

The flow dynamics are very fast, and may be simplified to an algebraic equation except when the engine flow is very low (throttle closed). As simplified then:

$m_{ChThr}=m_{ChEng}$

Mixing dynamics are used at 412, based on a non-linear and time varying equation that is not observable, in the sense that an on-line sensor to determine any current value is not available; as a result the model is run in open loop. The estimated EGR mass flow and throttle mass flow are used to estimate the BGF entering the intake manifold in block 412. Block 420 then uses the estimate of charge air mass entering the engine, less the estimated BGF in the intake manifold, to estimate the mass of fresh air entering the engine.

The throttle/EGR predictive controller uses a second MPC. For a cost function, the following terms are present:

$$\sum_{k=1}^{N} w_{1(k)}(m_A(t+k) - m_{ATgt})^2 + w_{2(k)}(m_{Ch}(t+k) - \min(m_{ChTgt},\ m_{ChMax}(t+k)))^2 + w_{3(k)}(x_2(t+k) - BGF_{IM,tgt})^2 + \sum_{k=1}^{N} w_4\Delta m_{Ch}(t+k)^2 + w_5\Delta m_{Egr}(t+k)^2$$

Weight w1 provides tuning for air demand tracking, weight w2 provides tuning for charge demand tracking, weight w3 provides tuning for EGR fraction at the intake manifold, weight w4 provides tuning for charge setpoint smoothness, and weight w5 provides tuning for EGR setpoint smoothness. Minimization of the function and the five weights allow tuning to prioritize between air delivery (torque tracking) and maintaining desired BGF during transient conditions.

The MPC cost function has the following constraints:

$m_{ChMin}(t+k)\le m_{ChSP}\le(t+k)\le m_{ChMax}(t+k)$ $0\le m_{EGR}(t+k)\le BGF_{Max}\cdot m_{Ch}(t+k)$ The EGR flow upper limit here is an approximation, and may not in fact be deliverable depending on transients, flow time, and exhaust gas pressure. Further, the EGR flow limits should be treated as soft constraints, as these are not necessarily box constraints.

Using the above set of calculations and analysis blocks, the three setpoints, A (charge flow setpoint), B (turbocharger kinetic energy setpoint), and C (EGR Flow setpoint), are then provided to the low-level controllers, as shown by FIGS. 2 and 3.

Figure 7:
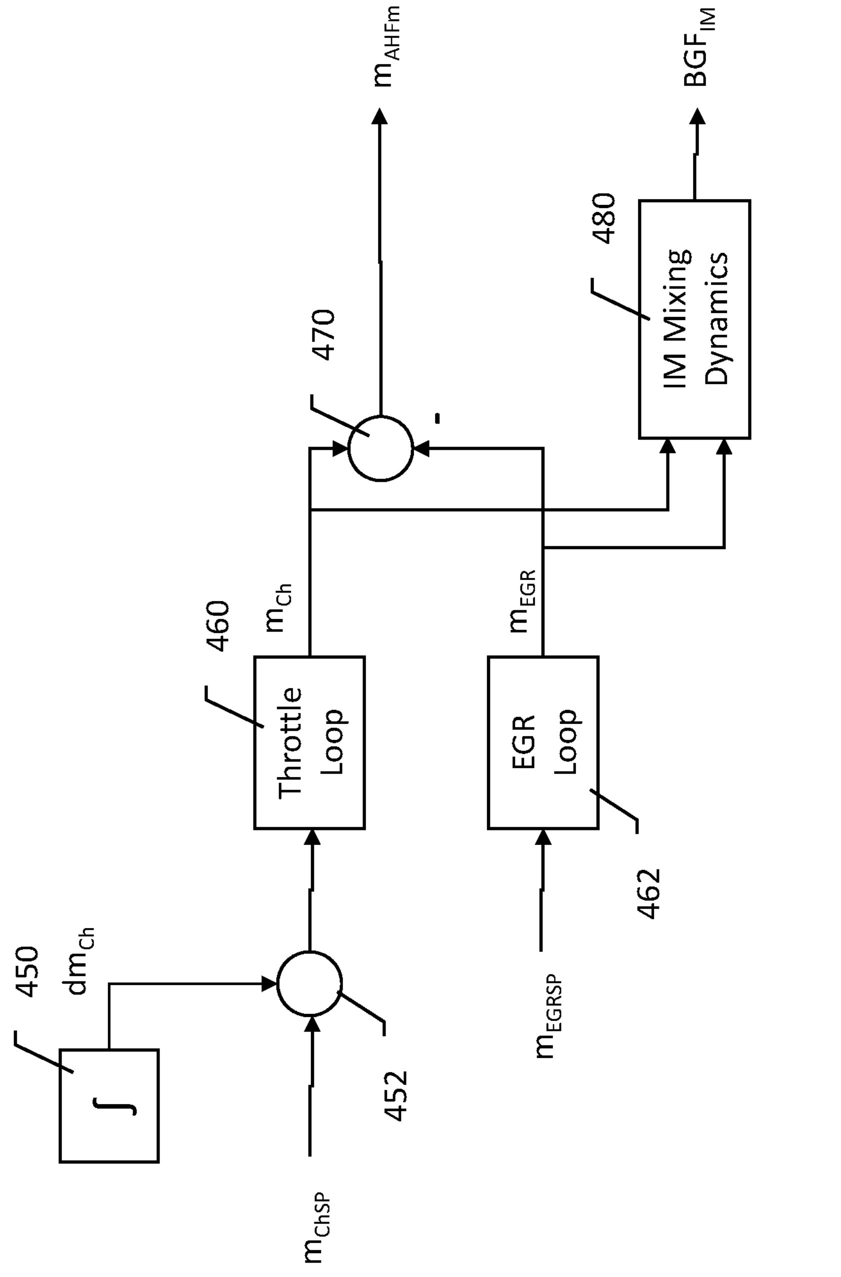
FIG. 7 shows a model structure for a Kalman-filter based flow observer.

FIG. 7 shows a model structure of a Kalman-filter based flow observer. The flow observer estimates a flow disturbance, $dm_{Ch}$ to allow model reconciliation. The air estimate is intended to converge to the measured air mass flow in the steady state, that is:

$m_{AHfm}=m_{ChTh}+d_{mCh}-m_{Egr}$

Where $m_{AHfm}$ is the measured air flow from the MAF 120 in FIG. 1. Here, in the flow observer Kalman filter design, an integrated flow disturbance from 450 is shown at $dm_{Ch}$ and is summed with the charged air mass flow setpoint at 450 and provided to the throttle loop 460, which is the same construct as shown above for FIG. 6 at 400. The output then is the charge mass air flow, as shown leaving throttle loop 460 in FIG. 7. The EGR loop 462 receives the EGR mass flow setpoint and estimates the actual mass flow through the EGR, $m_{EGR}$. The fresh air mass is output from the difference at 470, as shown, and should be close to the measured fresh air mass from the MAF 120 in FIG. 1. The intake manifold mixing dynamics discussed above are again applied at 480, and the estimated BGF at the intake manifold is output.

Referring back to FIG. 2, the air path coordinator 210 architecture as described above includes two MPC controller blocks, one for the reference governor for the boost controller, and the other for the throttle/EGR controller. The boost controller reference governor is an MPC that operates independently of the throttle/EGR MPC, and supplies predictions to be used in a limit calculator for the throttle/EGR controller. The output of the boost controller reference governor is the turbocharger kinetic energy setpoint (B). If boost mode is not needed, the reference governor may be inactive. The throttle/EGR controller is another MPC, and is limited by the reference governor predictions. For those limits to function well, the time horizon for the throttle/EGR controller MPC is shorter than that of the reference governor MPC. For example, depending on engine configuration, the time horizon for the throttle/EGR controller may be about 1-2 seconds, or more or less, and the reference governor having a longer time horizon in the range of 1-10 seconds, or more or less, as desired. The output of the throttle/EGR controller is a coordinated pair of setpoints: the EGR flow setpoint and the charge flow setpoint (A and C).

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." Moreover, in the claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, innovative subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the protection should be determined with reference to the appended claims, along with the full scope of equivalents to which such claims are entitled.

What is claimed is:

1. An engine system comprising:

a combustion engine having one or more combustion cylinders, an intake manifold and an exhaust manifold;

an air intake;

a turbocharger comprising a compressor having a compressor outlet, the compressor adapted for compressing air into charged air and a turbine positioned to receive exhaust gas from the exhaust manifold, the turbine either being associated with a wastegate, or being a variable nozzle geometry turbine;

a charge air cooler configured to cool charged air from the compressor outlet;

a throttle controlling cooled charged air delivery from the charge air cooler to the intake manifold;

a low pressure exhaust gas recirculation (EGR) flow path including an EGR valve for circulating exhaust gas exiting the turbine to the compressor, such that the charged air exiting the compressor outlet is a mix of fresh air with a burned gas fraction;

an EGR valve pressure difference sensor, and a plurality of engine sensors; and a controller structure comprising:

a throttle controller configured to receive a charge flow setpoint and issue a throttle position control signal to the throttle;

a turbocharger kinetic energy controller configured to receive a turbocharger kinetic energy setpoint and an estimated turbocharger speed, and to issue either a wastegate position control signal or a variable nozzle turbine control signal;

an EGR controller for receiving an estimate of EGR flow and an EGR flow setpoint and generating an EGR valve control signal to the EGR valve, an airpath coordinator configured to receive a desired torque signal and a burned gas fraction target and output each of the charge flow setpoint, the turbocharger kinetic energy setpoint, and the EGR flow setpoint;

an EGR estimator configured to estimate EGR flow using a model of EGR flow and data from the EGR valve pressure difference sensor; and a turbo speed estimator configured to estimate turbo speed using a model of turbocharger operation and sensor data from the engine.

2. The engine system of claim 1, wherein:

the airpath coordinator comprises a first model predictive control module and a second model predictive control module;

the first model predictive control module is a reference governor that provides the turbocharger kinetic energy setpoint using a cost function operating on a first time horizon;

the second model predictive control module is a throttle-EGR coordinator that receives airflow predictions from the first model predictive control module and provides the charge flow setpoint and the EGR flow setpoint using a cost function operating on a second time horizon; and the second time horizon is shorter than the first time horizon.

3. The engine system of claim 1, wherein the turbine is the variable nozzle geometry turbine, and the turbocharger kinetic energy controller outputs the variable nozzle turbine control signal to the variable nozzle geometry turbine.

4. The engine system of claim 1, further comprising the wastegate associated with the turbine, to allow exhaust gasses to bypass the turbine, and the turbocharger kinetic energy controller outputs the wastegate position control signal to the wastegate.

5. The engine system of claim 1, wherein the engine sensors include each of a fresh air pressure sensor, a fresh air temperature sensor, a compressor outlet pressure sensor, an intake manifold pressure sensor, an intake manifold temperature sensor, and a lambda sensor for sensing exhaust gas oxygen.

6. The engine system of claim 1, wherein the combustion cylinders are configured to burn gasoline, and the controller structure is configured to target a stoichiometric ratio based on characteristics of gasoline.

7. A system controller, the engine system including a combustion engine having one or more combustion cylinders, an intake manifold and an exhaust manifold, an air intake, a turbocharger comprising a compressor having a compressor outlet, the compressor adapted for compressing air into charged air and a turbine positioned to receive exhaust gas from the exhaust manifold, the turbine either being associated with a wastegate, or being a variable nozzle geometry turbine, a charge air cooler configured to cool charged air from the compressor outlet, a throttle controlling cooled charged air delivery from the charge air cooler to the intake manifold, a low pressure exhaust gas recirculation (EGR) flow path including an EGR valve for circulating exhaust gas exiting the turbine to the compressor, such that the charged air exiting the compressor outlet is a mix of fresh air with a burned gas fraction, an EGR valve pressure difference sensor, and a plurality of engine sensors; the system controller comprising:

a throttle controller configured to receive a charge flow setpoint and issue a throttle position control signal to the throttle;

a turbocharger kinetic energy controller configured to receive a turbocharger kinetic energy setpoint and an estimated turbocharger speed, and to issue either a wastegate position control signal or a variable nozzle turbine control signal;

an EGR controller for receiving an estimate of EGR flow and an EGR flow setpoint and generating an EGR valve control signal to the EGR valve;

an airpath coordinator configured to receive a desired torque signal and a burned gas fraction target and output each of the charge flow setpoint, the turbocharger kinetic energy setpoint, and the EGR flow setpoint;

an EGR estimator configured to estimate EGR flow using a model of EGR flow and data from the EGR valve pressure difference sensor; and a turbo speed estimator configured to estimate turbo speed using a model of turbocharger operation and sensor data from the engine.

8. The system controller of claim 7, wherein:

the airpath coordinator comprises a first model predictive control module and a second model predictive control module;

the first model predictive control module is a reference governor that provides the turbocharger kinetic energy setpoint using a cost function operating on a first time horizon;

the second model predictive control module is a throttle-EGR coordinator that receives airflow predictions from the first model predictive control module and provides the charge flow setpoint and the EGR flow setpoint using a cost function operating on a second time horizon; and the second time horizon is shorter than the first time horizon.

9. The system controller of claim 7, wherein the turbine is the variable nozzle geometry turbine, and the turbocharger kinetic energy controller outputs the variable nozzle turbine control signal to the variable nozzle geometry turbine.

10. The system controller of claim 7, wherein the engine system includes the wastegate associated with the turbine, to allow exhaust gasses to bypass the turbine, and the turbocharger kinetic energy controller outputs the wastegate position control signal to the wastegate.

11. The system controller of claim 7, wherein the engine sensors include each of a fresh air pressure sensor, a fresh air temperature sensor, a compressor outlet pressure sensor, an intake manifold pressure sensor, an intake manifold temperature sensor, and a lambda sensor for sensing exhaust gas oxygen, and the system controller is configured to receive outputs from each of the engine sensors.

12. The system controller of claim 7, wherein the combustion cylinders of the engine are configured to burn gasoline, and the system controller is configured to target a stoichiometric ratio based on characteristics of gasoline.

13. A method of operating an engine system, the engine system including a combustion engine having one or more combustion cylinders, an intake manifold and an exhaust manifold, an air intake, a turbocharger comprising a compressor having a compressor outlet, the compressor adapted for compressing air into charged air and a turbine positioned to receive exhaust gas from the exhaust manifold, the turbine either being associated with a wastegate, or being a variable nozzle geometry turbine, a charge air cooler configured to cool charged air from the compressor outlet, a throttle controlling cooled charged air delivery from the charge air cooler to the intake manifold, a low pressure exhaust gas recirculation (EGR) flow path including an EGR valve for circulating exhaust gas exiting the turbine to the compressor, such that the charged air exiting the compressor outlet is a mix of fresh air with a burned gas fraction, an EGR valve pressure difference sensor, and a plurality of engine sensors; and a controller structure comprising a throttle controller, a turbocharger kinetic energy controller, an EGR controller, an airpath coordinator, an EGR estimator, and a turbo speed estimator, the method comprising:

the throttle controller receiving a charge flowy setpoint and issuing a throttle position control signal to the throttle;

the turbocharger kinetic energy controller receiving a turbocharger kinetic energy setpoint and an estimated turbocharger speed, and issuing either a wastegate position control signal or a variable nozzle turbine control signal;

the EGR controller receiving an estimate of EGR flow and an EGR flow setpoint, and generating an EGR valve control signal;

the airpath coordinator receiving a desired torque signal and a burned gas fraction target, and outputting each of the charge flow setpoint, the turbocharger kinetic energy setpoint, and the EGR flow setpoint;

the EGR estimator estimating EGR flow using a model of EGR flow and data from the EGR valve pressure difference sensor, and issuing the estimate of EGR flow to the EGR controller; and the turbo speed estimator estimating turbo speed using a model of turbocharger operation and sensor data from the engine, and providing the estimated turbo speed to the turbocharger kinetic energy controller.

14. The method of claim 13, wherein:

the airpath coordinator comprises a first model predictive control module and a second model predictive control module;

the first model predictive control module is a reference governor that provides the turbocharger kinetic energy setpoint using a cost function operating on a first time horizon;

the second model predictive control module is a throttle-EGR coordinator that receives airflow predictions from the first model predictive control module and provides the charge flow setpoint and the EGR flow setpoint using a cost function operating on a second time horizon; and the second time horizon is shorter than the first time horizon.

15. The method of claim 13, wherein the turbine the variable nozzle geometry turbine, and the turbocharger kinetic energy controller outputs the variable nozzle turbine control signal to the variable nozzle geometry turbine.

16. The method of claim 13, wherein the engine system includes the wastegate associated with the turbine, to allow exhaust gasses to bypass the turbine, and the turbocharger kinetic energy controller outputs the wastegate position control signal to the wastegate.

17. The method of claim 13, wherein the engine sensors include each of a fresh air pressure sensor, a fresh air temperature sensor, a compressor outlet pressure sensor, an intake manifold pressure sensor, an EGR valve pressure difference sensor, an intake manifold temperature sensor, and a lambda sensor for sensing exhaust gas oxygen.

18. The method of claim 13, wherein the combustion chambers are configured to burn gasoline, and the airpath coordinator uses a stoichiometric ratio for gasoline.

* * * * *